(12) United States Patent
Mehlmann et al.

(10) Patent No.: US 9,987,820 B2
(45) Date of Patent: Jun. 5, 2018

(54) MULTILAYER STRUCTURES CONTAINING BIOPOLYMERS

(75) Inventors: Florence Mehlmann, King of Prussia, PA (US); Robert J. Barsotti, Drexel Hill, PA (US); Charles C. Crabb, Royersford, PA (US); Thomas H. Richards, New Britain, PA (US); Steven B. Lacock, Boyertown, PA (US); Mark A. Aubart, West Chester, PA (US)

(73) Assignee: Arkema France, Colombes (FR)

( * ) Notice: Subject to any disclaimer, the term of this patent is extended or adjusted under 35 U.S.C. 154(b) by 72 days.

(21) Appl. No.: 13/559,783

(22) Filed: Sep. 7, 2012

(65) Prior Publication Data

US 2012/0328808 A1  Dec. 27, 2012

Related U.S. Application Data

(63) Continuation-in-part of application No. 13/390,625, filed as application No. PCT/US2010/055592 on Nov. 5, 2010, now Pat. No. 8,835,544.
(Continued)

(51) Int. Cl.
*B32B 27/00* (2006.01)
*B32B 5/18* (2006.01)
(Continued)

(52) U.S. Cl.
CPC ............ *B32B 5/18* (2013.01); *B29C 47/0004* (2013.01); *B29C 47/0019* (2013.01);
(Continued)

(58) Field of Classification Search
CPC ......... B32B 27/00; B32B 27/08; B32B 27/18; B32B 27/308
(Continued)

(56) References Cited

U.S. PATENT DOCUMENTS 5,318,737 A  6/1994  Trabert et al.
5,346,954 A  9/1994  Wu et al.
(Continued)

FOREIGN PATENT DOCUMENTS

EP  1942001  * 7/2008  ............ B32B 27/36
JP  11279380 A  10/1999
(Continued)

*Primary Examiner* — Ellen S Wood
(74) *Attorney, Agent, or Firm* — Thomas F. Roland

(57) ABSTRACT

The invention relates to a multi-layer structure in which one or more layers contain an acrylic polymer, and one or more layers contain biopolymers. The acrylic polymer and biopolymer could be in different layers of the structure, or in the same layer of the structure. The combination of acrylic polymer and biopolymer in the same multi-layer structure provides improved properties, such as improved adhesion, improved mechanical properties, and improvements in the ease of manufacturing. An inner layer containing a biopolymer gains significantly improved UV resistance, abrasion resistance, and surface appearance, when covered with an outer acrylic layer. The multi-layer structure may be in the form of a sheet, a film, a tube or pipe, or a profile, and could used by itself or as a cap-layer over another substrate.

11 Claims, 1 Drawing Sheet

Related U.S. Application Data

(60) Provisional application No. 61/261,865, filed on Nov. 17, 2009.

(51) Int. Cl.
*B32B 27/06* (2006.01)
*B32B 27/08* (2006.01)
*B32B 27/30* (2006.01)
*B32B 27/36* (2006.01)
*B29C 47/00* (2006.01)
*B29C 47/06* (2006.01)
*B29L 9/00* (2006.01)
*B29K 33/00* (2006.01)

(52) U.S. Cl.
CPC ...... *B29C 47/0021* (2013.01); *B29C 47/0023* (2013.01); *B29C 47/0026* (2013.01); *B29C 47/0033* (2013.01); *B29C 47/065* (2013.01); *B29C 47/067* (2013.01); *B32B 27/06* (2013.01); *B32B 27/08* (2013.01); *B32B 27/308* (2013.01); *B32B 27/36* (2013.01); *B29K 2033/08* (2013.01); *B29K 2033/12* (2013.01); *B29K 2995/0056* (2013.01); *B29L 2009/00* (2013.01); *B32B 2266/0242* (2013.01); *B32B 2266/0264* (2013.01); *B32B 2270/00* (2013.01); *B32B 2307/584* (2013.01); *B32B 2307/71* (2013.01); *B32B 2307/7163* (2013.01); *Y10T 428/1352* (2015.01); *Y10T 428/249992* (2015.04); *Y10T 428/269* (2015.01)

(58) Field of Classification Search
USPC ...... 428/34.9, 213, 402, 403, 483, 458, 481, 428/480
See application file for complete search history.

(56) References Cited

U.S. PATENT DOCUMENTS

| | | | |
|---|---|---|---|
| 5,449,708 A * | 9/1995 | Schiltz | C08L 3/02 523/126 |
| 6,180,750 B1 | 1/2001 | May et al. | |
| 7,273,894 B2 | 9/2007 | Shelby et al. | |
| 7,282,535 B2 | 10/2007 | Kakeda et al. | |
| 7,317,050 B2 | 1/2008 | Destarac et al. | |
| 7,589,151 B2 | 9/2009 | Aoki et al. | |
| 7,666,946 B2 | 2/2010 | Brake et al. | |
| 2001/0056150 A1 | 12/2001 | Smith et al. | |
| 2002/0160201 A1 | 10/2002 | Ohkura et al. | |
| 2003/0176541 A1 | 9/2003 | Pixton et al. | |
| 2005/0221032 A1 * | 10/2005 | Yamane et al. | 428/34.9 |
| 2007/0009752 A1 * | 1/2007 | Lefebvre | B32B 27/06 428/500 |
| 2007/0179218 A1 * | 8/2007 | Brake | C08J 3/005 524/27 |
| 2008/0182113 A1 * | 7/2008 | Hausmann et al. | 428/458 |
| 2008/0188154 A1 * | 8/2008 | Leis et al. | 442/181 |
| 2008/0255295 A1 | 10/2008 | Fraser et al. | |
| 2009/0018237 A1 | 1/2009 | Fujii et al. | |
| 2009/0030132 A1 | 1/2009 | Kumazawa et al. | |
| 2009/0130347 A1 | 5/2009 | Nakano et al. | |
| 2009/0169844 A1 * | 7/2009 | Yamamura | B32B 27/30 428/213 |
| 2012/0142823 A1 | 6/2012 | Cygan et al. | |
| 2012/0164364 A1 | 6/2012 | Mehlmann | |
| 2014/0308535 A1 | 10/2014 | Yakushidou et al. | |

FOREIGN PATENT DOCUMENTS

| | | |
|---|---|---|
| JP | 2000169659 A | 6/2000 |
| JP | 2000185380 A | 7/2000 |
| JP | 2005008861 A | 1/2005 |
| JP | 2009066915 A | 9/2007 |
| KR | 20120049562 A | 5/2012 |
| KR | 20120049563 A | 5/2012 |

* cited by examiner

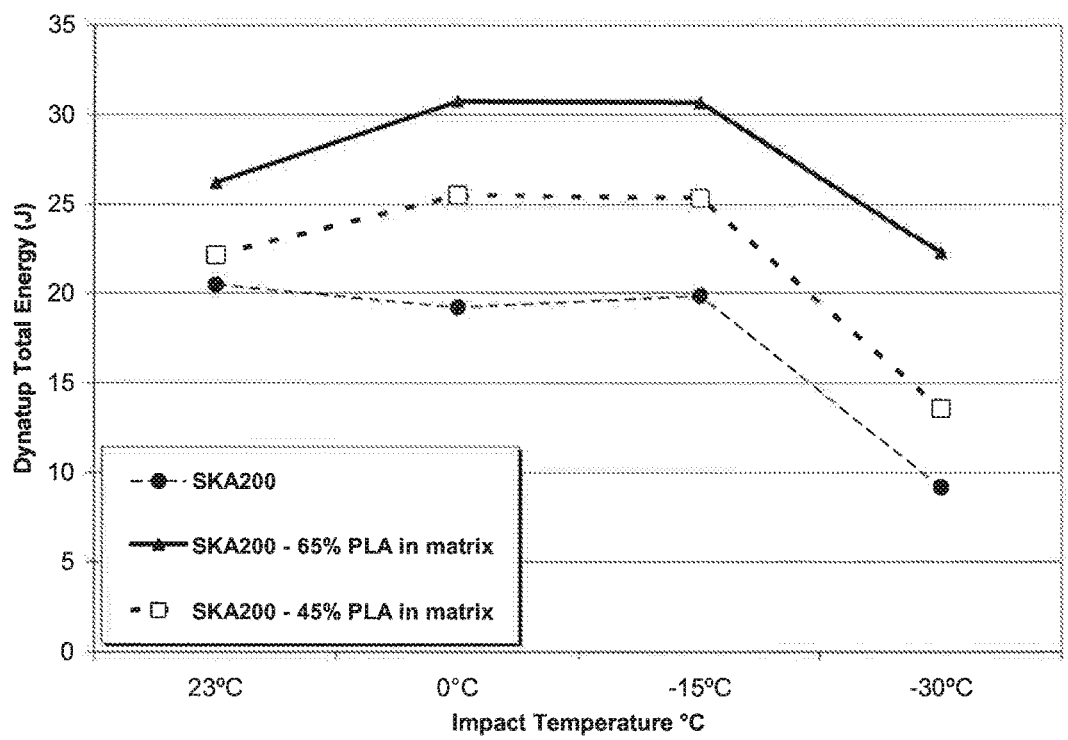

MULTILAYER STRUCTURES CONTAINING BIOPOLYMERS

This application is a continuation in part of U.S. patent application Ser. No. 13/390,625, filed Mar. 12, 2012, from which priority is claimed. This application also claims benefit, under U.S.C. § 119(e) of U.S. Provisional Application No. 61/261,865, filed Nov. 17, 2009, and PCT/US10/55592 filed Nov. 5, 2010.

FIELD OF THE INVENTION

The invention relates to a multi-layer structure in which one or more layers contain an acrylic polymer, and one or more layers contain biopolymers. The acrylic polymer and biopolymer could be in different layers of the structure, or in the same layer ofteh structure. The combination of acrylic polymer and biopolymer in the same multi-layer structure provides improved properties, such as improved adhesion, improved mechanical properties, and improvements in the ease of manufacturing, An inner layer containing a biopolymer gains significantly improved UV resistance, abrasion resistance, and surface appearance, when covered with an outer acrylic layer.

The multi-layer structure may be in the form of a sheet, a film, a tube or pipe, or a profile, and could used by itself or as a cap-layer over another substrate.

BACKGROUND OF THE INVENTION

Certain structural plastics, such as high impact polystyrene (HIPS), acrylonitrile/butadiene/styrene (ABS) resins, poly(vinyl chloride) (PVC) resins, thermoplastic olefins (TPO), and the like, exhibit attractive mechanical properties when extruded, molded, or formed into various articles of manufacture. Such articles include, for example, bathtubs, shower stalls, counters, appliance housings and liners, building materials, doors, windows, siding, decking, railings and shutters, lawn and garden articles, marine articles, swimming pool articles, automotive components, and storage articles.

Although these structural plastics otter attractive property characteristics, the properties of their exposed surfaces can be less than ideal. That is, the surfaces of the structural plastics are degraded by light, they can be easily scratched, and/or they can be eroded by common solvents. Consequently, it has become a practice in the industry to apply another resinous material over one or both sides of the structural plastic to protect the underlying structural material and provide a surface that can withstand abuse associated with the use environment. Such surfacing materials are called "capstocks".

The capstock generally is much thinner than the structural plastic, typically being about 5 to about 25% of the total thickness of the composite comprising the capstock and structural plastic plies. For example, the thickness of the capstock can be about 0.05 to about 2.5 mm, whereas the thickness of the structural plastic ply can be about 1.0 to about 10 mm.

As a class, acrylic polymers, known for their excellent optical characteristics, resistance to degradation by sunlight, hardness, inertness to water and common chemicals, durability, and toughness, are capstocks of choice for various structural plastics. Such acrylic capstocks are described in U.S. Pat. Nos. 6,852,405. 5,318,737 describes the use of an impact modified acrylic capstock for use over PVC by coextrusion.

Multi-layered polymeric structures are useful to take advantage of the properties of the different polymers. However when one or more capstock layers of a multilayer structure comprise an acrylic polymer, various issues may arise. The adhesion between some layers may not be sufficient. The overall structure may have decreased mechanical strength, especially when some amount of scrap is reworked into the structural plastic layers. Juxtaposed layers may have very different melt viscosities, leading to potential manufacturing difficulties when the multilayer structure is obtained by processes such as co-extrusion.

Biopolymers are finding use as environmentally-friendly alternatives for many common plastics in typical applications, such as in packaging materials and bottling. Biopolymers can be defined either as polymers manufactured from a renewable carbon source, or as polymers that are biodegradable or compostable for example, or both. Most biopolymers suffer from poor physical properties and poor weatherability. Polylactic acid is very brittle, resulting in very low impact properties of finished articles.

It is desired to combine the performance and appearance of an acrylic polymer with the environmental benefits of biopolymers.

U.S. Pat. No. 7,666,946 and US 2012/0142823 describe the modification of biopolymers with up to 15 percent of an acrylic modifier.

JP2000185380A, and US2002160201A, describe thin coated polylactic acid films for packaging applications. The coating can be made of an acrylic resin, however its thickness is less than 5 microns, and it has a low modulus in order to improve the films flexibility.

JP2009066915A describes a multilayer film or sheet formed by laminating a plant-derived resin layer and a rubber reinforcing styrene resin layer. The multilayer structure exhibits low environment load, excellent dimensional stability, and excellent durability under a high-temperature and high-humidity environment. However, it suffers from limited resistance to UV rays, due to the nature of the described layers.

U.S. application Ser. No. 13/390,625, US 2007/0276090, and US 2009/0018237 describe a blend of PLA matrix, acrylic polymer and a core/shell impact modifier having either a hard core layer, or a soft core layer.

It is desired to produce a multilayer structure having acrylic and biopolymers as part of the structure, that overcomes the problems of the structures of the art.

Surprisingly it has been found that a multilayer structure containing acrylic polymers and biopolymers can be produced, having excellent surface properties, such as UV resistance, scratch resistance, chemical resistance, as well as excellent adhesion between juxtaposed layers, excellent impact strength, and ease of manufacture. In one embodiment the adhesion of layers is improved by using an acrylic/biopolymer alloy. In another embodiment the addition of a biopolymer to a layer having an acrylic polymer greatly improves the mechanical strength, reinforcing the mechanical strength of the overall structure, including materials that contain rework scrap. In some cases, the addition of a biopolymer to a layer having an acrylic polymer, modifies the melt viscosity of such polymer, and facilitates the manufacture of the overall structure by melt extrusion.

Further, it also has been found that when internal layers, including the structural plastic substrate, comprise one or more biopolymers, first surface capstock layers comprising an acrylic polymer offer significantly improved UV resistance, abrasion resistance, chemical resistance, and surface appearance.

SUMMARY OF THE INVENTION

The invention relates to a multilayer structure comprising:
a) one or more layers having a polymer matrix comprising 16 to 100 weight percent of one or more acrylic polymers, wherein said acrylic polymer-containing layer has a thickness of greater than 50 microns and
b) one or more layers having a polymer matrix comprising at least 5 weight percent of a biopolymer.

The invention further relates to objects formed from the multilayer structure and means for producing these objects.

BRIEF DESCRIPTION OF THE DRAWINGS

FIG. 1 is a plot of the multiaxial impact testing of the samples in Example 2, at various temperatures, using a Instron Dynatup 9250G tester.

DETAILED DESCRIPTION OF THE INVENTION

The invention relates to a multi-layer structure in which one or more layers contain an acrylic polymer, and one or more layers also contain specific biopolymers. The acrylic polymer and biopolymer could be in different layers of the structure, or in the same layer of the structure.

All percentages used herein are weight percentages, unless otherwise specified, and all molecular weight are weight averages unless otherwise specified.

Multilayer Sheet Structure

The multilayer structures of the invention include films, sheets, profiles and articles having two or more structural layers. The structures may be planar, curved, angled or of any shape—including pipes, tubes and hollow structures. By structural layers is meant a layer included in the structure to provide specific properties to the structure. Specifically, the term structural layer is meant to exclude adhesive or tie layers, though these may be present in the structure in addition to the two or more structural layers.

As used herein, the term "layer" refers to each of the one or more different materials, the same or different, that are secured to one another by any appropriate means, such as by inherent tendency of the materials to adhere to one another, or by inducing the materials to adhere by a heating, radiation, chemical, or any appropriate process. Each layer has a thickness of at least 0.05 mm. The layers could be held together by one or more adhesives or tie layers. A "different" layer means any change in the composition of the layer compared to another layer. Two identical layers could exist in the multilayer structure, as in the case of a three layer structure having an inner core layer and covered on both sides with identical material layers.

One such difference could be a different chemistry of the polymer matrix of the layers. For example one layer may have an acrylic polymer matrix, another layer could have a biopolymer matrix, and still another layer could have an alloy (blend) of acrylic polymer and biopolymer (that can each be independently the same or different acrylic and biopolymers found in the other layers) as the matrix polymer. In the case of alloys, different percentage ratios of each component in two layers would represent different layers. When additives, including impact modifiers, are used, an impact-modified matrix and an identical matrix having no impact modification, would represent different layers.

In one embodiment, an outer matrix could contain impact modifiers having a certain particle size range (such as having a lower particle size average—for example under 250 microns) in order to provide a smoother surface, while an inner layer could have impact modifiers with a larger particle size (for example over 250 microns) to provide greater impact resistance.

In a preferred embodiment, two or more layers have different polymer matrices. Each layer preferably has a thickness of greater than 25 microns, preferably greater than 50 microns, more preferably greater than 75 microns, and most preferably greater than 100 microns. The layers of the invention are not meant to include coatings.

Biopolymer

"Biopolymer", as used herein is meant to include polymers manufactured from a renewable carbon source, polymers that are biodegradable or compostable, or both. Biopolymers of this invention include, but are not limited to, polyesters, cellulosic esters, polyamides, starch and starch derivatives, shellac, sugars, polypeptides, nucleic acids, zein, cellophane, piastarch, polycaprolactone, polyglycolide, and chitosan. Useful polyesters include, but are not limited to, polylactic acid, polyhydroxyalkanoates, polycaprolactone, polyesteramide, polybutylene succinate, polyethylene adipate. A preferred polyester is polylactic acid.

Useful cellulosic esters include, but are not limited to: cellulose acetate, cellulose triacetate, cellulose propionate, cellulose acetate propionate, cellulose acetate butyrate, and cellulose acetate phthalate.

A layer of the biopolymer may be modified by stretching. In a preferred embodiment, a biopolymer layer is unstretched.

A layer could have any level of biopolymer to be considered a biopolymer layer. In one embodiment, the matrix polymer is 100 percent biopolymer. In another embodiment, the level of biopolymer is from 5 to 100 percent of the matrix polymer, preferably 10 to 100 percent, and more preferably 20 to 100 percent of the matrix polymer.

In one embodiment, the layer containing the biopolymer is in a cellular or foamed form.

Acrylic Polymer

"Acrylic polymer", as used herein is meant to include polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture, and preferably from 70 to 100 percent. 0 to 50 percent, and preferably 0 to 30 percent, of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methacrylic acid and acrylic acid can be useful for the monomer mixture. Most preferably the acrylic. polymer is a copolymer having 70-99.5 weight percent of methyl methacrylate units and from 0.5 to 30 weight percent of one or more $C_{1-8}$ straight or branched alkyl acrylate units.

In a preferred embodiment, the acrylic polymer has a Tg of greater than 70° C., and more preferably greater than 75° C.

In one embodiment, the acrylic polymer has a weight average molecular weight of between 50,000 and 500,000 g/mol, and preferably from 75,000 and 150,000, as measured by gel permeation chromatography. The molecular weight distribution of the acrylic polymer is monomodal or multimodal and the polydispersity index is higher than 1.5.

In another embodiment, the acrylic polymer has a weight average molecular weight higher than 500,000 g/mol, and preferably higher than 1,000,000 g/mol, as measured by gel permeation chromatography. The molecular weight distribution of the acrylic polymer is monomodal or multimodal and the polydispersity index is higher than 4.

In another embodiment, the acrylic polymer comprises a blend of two or more of the polymers described in the above two embodiments.

In another embodiment, a portion of the acrylic polymer is cross-linked into polymeric particles with a particle size between 0.5 microns and 1,000 microns.

Preferably, a layer containing the acrylic polymer is greater 50 microns in thickness, and most preferably at least 70 microns in thickness.

The acrylic layer preferably contains at least 16 weight percent or more of acrylic polymer in the polymer matrix, more preferably at least 20 weight percent, more preferably over 50 weight percent to 100 weight percent.

Alloys of Acrylic Polymer and Biopolymer

In one embodiment of the invention, one or more layers of the multi-layer structure contain an alloy of both one or more acrylic polymers and one or more biopolymers as the polymer matrix. The acrylic and biopolymer materials are compatible, semi-miscible, or miscible. The acrylic and biopolymer materials should be capable of being blended in a ratio such that a single intimate mixture is generated without loss of mechanical integrity at usage temperature. The alloy serves as the polymer matrix for the layer.

The alloy contains 5 to 95 weight percent and preferably 20-80 weight percent of acrylic polymer(s), and 5 to 95 weight percent and preferably 5 to 95 weight percent biopolymer(s).

The acrylic polymer, low melt viscosity polymer, and optionally and additives (including impact modifiers) can be blended in any order, and by any means known in the art. For example, the components can be dry-blended prior to being melted, or directly melt blended together, such as in an extruder, or intimately mixed in a suitable solvent.

Impact Modifiers

The acrylic layer, biopolymer layer, alloy, or each may contain one or more additives. In one embodiment impact modifiers may be added into the polymer matrix. The impact modifier may be present at a level of from 0 to 80 weight percent, preferably 10 to 45, and more preferably from 20 to 40 weight percent, based on the polymer matrix. Impact modifiers useful in the invention include, but are not limited to, core-shell particles, block copolymers, and graft copolymers.

Core-shell impact modifier, as used herein is a multi-stage, sequentially-produced polymer having a core/shell. particle structure of at least two layers. Preferentially, the core-shell modifier comprises three layers made of a hard core layer, one or more intermediate elastomeric layers, and a hard shell layer. The presence of a hard core layer provides a desirable balance of good impact strength, high modulus, and excellent UV resistance, not achieved with a core/shell modifier that possesses a soft-core layer.

"Hard layers" (Tg>0° C., preferably Tg>20 ° C.) are typically a single composition polymer, but can also include the combination of a small amount of a low Tg seed on which the hard core layer is formed. For example, a small 5% rubber core seed that becomes dispersed into a hard core layer would be included in the invention as a hard core layer. Hard layer can be chosen from any thermoplastic meeting the Tg requirements. Preferably, a hard layer is composed primarily of methacrylate ester units, acrylate ester units, styrenic units, or a mixture thereof Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloh.eyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acryl ate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard layer is all-acrylic.

At least one core or intermediate layer is elastomeric "soft layer", having a Tg of less than 0° C., and preferably less than −20° C. Preferred elastomers include polymers and copolymers of alkyl aerylates, dimes, styrenics, and mixtures thereof. Preferably a soft layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene, Useful styrenics include, but are not limited to alpha-methyl styrene, and para methyl styrene.

The outer shell layer can be made of one or more shell layers, having a Tg>0° C., more preferably Tg>20 ° C. The shell layer may be the same or different composition other "hard layers".

Preferably the multi-stage polymer is a three stage composition wherein the stages are present in ranges of 10 to 40 percent by weight, preferably 10 to 20 percent, of the first stage (a), 40 to 70 percent, preferably 50 to 60, of the second intermediate stage (b), and 10 to 50 percent, preferably 20 to 40, of the final stage (c), all percentages based on the total weight of the three-stage polymer particle.

In one embodiment the core layer is a polymethylmethacrylate-ethylacrylate copolymer, the middle layer is a crosslinked polybutylaerylate-styrene copolymer, and the outer shell is a polymethylmethaerylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In one embodiment the refractive index of the core/shell particle matches the total refractive index of the matrix. By match is meant that the refractive index of the core/shell particle should be within 0.03 units of the matrix polymer blend, and preferably within 0.02 units.

Other Additives

The acrylic polymer and biopolymer polymer matrix layers of the multilayer structures of this invention may further contain other additives typically present in polymer formulations, including but not limited to, stabilizers, plasticizers, fillers, coloring agents, pigments, antioxidants, antistatic agents, surfactants, toner, refractive index matching additives, additives with specific light diffraction, light reflection, or light absorbing characteristics, and dispersing aids.

In one embodiment, an additive is provided to help prevent degradation of the layer composition upon exposure to radiation, such as high levels of UV radiation or gamma radiation. Useful radiation stabilizers include, but are not limited to poly(ethylene glycol), poly(propylene glycol), butyl lactate, and carboxylic acids such as lactic acid, oxalic acid, acetic acid, or a mixture thereof.

In another embodiment, an additive is provided to achieve specific light manipulation of the layer with specific light diffraction or light reflection characteristics. Useful additives include, but are not limited to polymeric or inorganic spherical particles with a particle size between 0.5 microns and 1,000 microns. In a preferred embodiment, the additive's refractive index is different from that of the matrix polymer, in order to achieve a haze higher than 10%.

Tie-Layers

Layers of the multilayer structure of the invention may optionally be bonded by tie layer or layers of adhesive. In a preferred embodiment, no tie layer or adhesive is used between the layers of the multi-layer structure. A tie layer may be needed to obtain satisfactory adhesion between a single or multi-layer sheet having acrylic and biopolymer, and a substrate. The tie layer could be provided to the structure during a coextrusion process, could be extrusion laminated, or can be applied during a lamination, press molding, or injection molding process. Any tie layer has an adhesive affinity to the layers on either side, and can be of any known composition. In one embodiment, the tie layer contains a blend of adhesive compounds in which each component of the blend has a compatible, miscible, or semi-miscible chemistry to one of the layers. In other embodiments, the tie layer is a copolymer having two or more functionalities, where each functionality has an affinity to a different layer.

Manufacture

The multilayer structures of this invention may be produced by any methods available in the art, such as by co-extrusion techniques, lamination techniques, thermoforming, or any combination thereof In one embodiment, co-extrusion is preferred.

Co-extrusion is a process in which two or more molten polymeric compositions are simultaneously extruded through a feedblock die or, alternatively, through a multi-manifold die, to form a laminar structure with different functional properties in each layer. Of particular interest is the use of a feedblock die to feed a multimanifold die in a single process, which provides great flexibility in the manufacture of the multilayer structures of the invention.

Lamination is the process of bonding together two or more prefabricated sheet or film layers by the use of adhesives, or by a combination of heat and pressure. Alternatively, hot melt lamination or thermal lamination brings two or more molten polymer layers together outside the extrusion die, usually at a nip roll or at the top roll of a roll stack.

Extrusion lamination involves first a formation of one layer by any known process, followed by extrusion of a tie layer and/or second layer onto the first layer. in an extrusion molding process, a structure having acrylic polymer and biopolymer layers (or an alloy of acrylic polymer and biopolymer) is placed into a mold, and a substrate polymer is injected behind it.

The multilayer structure can have any given geometry, including but not limited to, a flat sheet, a rod, or a profile.

Uses:

The multilayer structure of the invention can be used by itself to form useful objects by known means, or can be combined with additional layers of materials.

The multilayer structure can be in a sheet form and thermoformed into an object, including but not limited to, automotive parts, recreational vehicles, bathtubs, shower stalls, counters, appliance housings and liners, building materials, doors, windows, siding, decking, railings and shutters, lawn and garden parts, and storage containers.

The multilayer structure could also be directly extruded into a profile, such as, but not limited to, deck board, hand rail siding, and window profiles.

In one embodiment, the multilayer biopolymer and acrylic polymer containing structure is used as a cap material to provide an aesthetic covering having improved weathering and durability to a substrate. The multilayer structure can be attached to the substrate either inherently using heat or radiation, or by the use of an adhesive or tie layer. The substrate may be another polymer (thermoplastic, elastomer, or thermoset) such as non-limiting examples polystyrene (PS), high impact polystyrene (HIPS), acrylonitrile/butadiene/styrene (ABS), styrene/butadiene or styrene/isoprene (SBS/SIS), hydrogenated SBS/SIS, polyolefin derivatives such as polypropylene, polyethylene, thermoplastic polyolefin copolymers, polyvinyl chloride (PVC), biopolymers, pultruded polyester or polyurethane composites; or can be a non-polymer material including, but not limited to paper, metal, ceramics, glass, etc In one embodiment, a single or multilayer structure that includes and acrylic polymer is used as a capstock over a biopolymer—forming a multi-layer structure.

In one embodiment it was found that an outer acrylic layer and an inner biopolymer layer over a substrate provides surprisingly improved impact resistance.

Some non-limiting examples of multi-layer structures anticipated by the invention include (PMMA being used generically to represent any acrylic polymer, and PLA being used generically to mean PLA itself or where PLA can be substituted with other biopolymers). Based on the disclosure herein, one of ordinary skill in the art can imagine other useful structures of the invention.

1. PMMA/PLA alloy over a polymer substrate layer.
2. PMMA/PLA alloy over a non-polymeric substrate.

3. PMMA layer over a PLA layer.
4. PMMA layer over a PMMA/PLA alloy.
5. PMMA/PLA alloy over a PMMA/PLA alloy, in which the alloy in each layer has a different ratio of PMMA/PLA, or the layers contain different types, different sizes (especially of impact modifiers) or different levels (including zero) of additives (including impact modifiers), or both.
6. any of the above structures 1-4 in which one or more of the layers is impact-modified.
7. any of the above structures 3-5 attached to a substrate, the substrate being polymeric or non-polymeric.
8. any of structures 3-5 having 3 or more layers with a PMMA layer on the front and back, and a PLA or PMMA/PLA alloy as an inner layer.
9. any of the above structures having an adhesive or tie layer between one or more layers.
10. a PMMA layer over a PLA or PLA/PMMA alloy, having a second PMMA of the same or different composition on the opposite side of the PLA or PLA/PMMA layer.
11. any of the above structures 1, 2, or 7, in which the substrate layer contains from 5 to 95 weight percent, and preferably from 20 to 80 weight percent of rework. The rework being recycled material of the whole multi-layer structure.
12. A PLA layer over a PMMA layer, for example in a case where it may be desirable to have an outer layer that wears away, exposing fresh polymer.

EXAMPLES

Example 1

Comparing adhesive strength of two-layer sheet made of an acrylic or a styrenic layer over a polylactic acid layer Monolithic sheets were produced by press-molding pellets of polylactic acid (Natureworks INGEO 2003D), impact-modified acrylic (Arkema PLEXIGLAS DR), and high-impact polystyrene (Total 960E). These sheets were then press-molded into two-layer sheet structures an impact-modified acrylic/polylactic acid sheet and a high-impact polystyrene/polylactic acid sheet, and the adhesion between the layers was qualitatively assessed by manual delamination.

Sheet made of impact-modified acrylic over polylactic acid showed excellent adhesion and the layers could not be manually separated, whereas sheet made of high-impact polystyrene over polylactic acid showed poor adhesion and the layers could easily be separated into the original monolithic sheets.

Example 2

Comparing impact strength of coextruded sheet made of a thermoplastic polyolefin substrate and a capstock layer based on either an impact acrylic, or a blend of impact acrylic and polylactic acid. Note that a suitable tie-layer is used in order to ensure good adhesion between the substrate layer and the capstock layer.

Three-layer coextrusion was performed using a TPO substrate (Lyondell-Basell E3400), a tie-layer (Arkema functional acrylic PRD940B), and three different capstock layers:
A. Impact-modified acrylic (Arkema SOLARKOTE A200)
B. The impact-modified acrylic of A. where 45 wt % of the matrix was displaced by Polylactic acid (Natureworks INGEO2003D)
C. The impact-modified acrylic of A. where 65 wt % of the matrix was displaced by polylactic acid (Natureworks INGEO2003D)

Multiaxial impact testing was performed at various temperatures, using a Instron Dynatup 9250G tester, The total energy reported in the case of the impact-modified acrylic capstock, was significantly increased, as the acrylic matrix was being substituted for polylactic acid.

Example 3

Comparing the weatherability of an extruded PLA sheet compared a to coextruded PLA sheet with an impact modified acrylic. Extrusion of a PLA~1600 micron sheet was performed. Coextrusion of a ~1600 micron PLA sheet with a ~250 micron Solarkote® H impact modified acrylic $1^{st}$ surface was then performed. Optical property measurements were performed using a BYK. Gardner Haze-Gard plus. Samples were exposed to weathering in FL for 6 months and then 12 months, After each time period, optical properties were measured. The use of an acrylic $1^{st}$ surface over the biopolymer substrate clearly prevents deterioration of optical properties.

| Months of FL Exposure/Haze (%) | Extruded PLA | Coextruded PLA with Solarkote ® H |
|---|---|---|
| 0 | 14.70 | 3.81 |
| 6 | 33.60 | 12.40 |
| 12 | 46.50 | 17.10 |

The invention claimed is:
1. A multilayer structure wherein said multilayer structure comprises, in order from outside to inside at least three coextruded layers comprising:
  a) an acrylic layer on the outer side exposed to the environment of the multilayer structure one or more layers having a polymer matrix comprising 16 to 100 weight percent of one or more acrylic polymers, wherein said acrylic polymers comprise 70 to 100 weight percent of methyl methacrylate units, wherein said outer acrylic layer has a thickness of greater than 50 microns, and
  b) one or more inner layers comprising a polymer matrix consisting of an alloy of 20 to 80 weight percent of one or more acrylic polymers comprising 70 to 100 weight percent of methyl methacrylate units, and 20 to 80 weight percent of one or more biopolymers wherein said biopolymer comprises polylactic acid, and/or polyhydroxy butyrate, wherein said layers a) and b) form a multi-layer capstock comprising 5 to 25 percent of the total thickness of the multilayer structure, and
  c) a substrate layer comprising one or more substrates selected from the group consisting of polystyrene, polystyrene derivatives polystyrene, high impact polystyrene (HIPS), acrylonitrile/butadiene/styrene (ABS), styrene/butadiene or styrene/isoprene (SBS/SIS), hydrogenated SBS/SIS, polyolefin derivatives, polypropylene, polyethylene, thermoplastic polyolefin copolymers, polyvinyl chloride (PVC), polyvinylidene fluoride (PVDF), pultruded polyester, and polyurethane composites,
  wherein said substrate layer comprises 75-95 percent of the total thickness of the multilayer structure, and wherein said multilayer cap stock layers and said substrate layer are coextruded together.

2. The multilayer structure of claim 1, wherein said acrylic polymer in both layers a) and b) comprises from 70 to 99.5 weight percent of methylmethacrylate monomer units, and from 0.5 to 30 weight percent of one or more $C_{1-8}$ alkyl acrylate monomer units.

3. The multilayer structure of claim 1, wherein one or more layers further comprises 5 to 60 weight percent of one or more impact modifiers, based on the total weight of the matrix polymer and all additives.

4. The multilayer structure of claim 3 wherein said impact modifier is a core-shell impact modifier having a hard core layer and one or more shells with a Tg of greater than 0° C., and one or more intermediate elastomeric layers with a Tg of less than 0° C.

5. The multilayer structure of claim 1 wherein one or more layers further comprises additives selected from the group consisting of stabilizers, plasticizers, fillers, coloring agents, pigments, antioxidants, antistatic agents, surfactants, toner, refractive index matching additives, additives with specific light diffraction, light absorption, or light reflection characteristics, and dispersing aids.

6. The multilayer structure of claim 1, wherein said structure further comprises one or more adhesive or tie layers that are coextruded with the capstock layers and the substrate layer.

7. The multilayer structure of claim 1, wherein said substrate comprises from 5 to 95 percent by weight of rework.

8. The multilayer structure of claim 1, where the overall structure thickness is from greater than 0.25 mm to 10 cm.

9. The multilayer structure of claim 1, comprising an object selected from the group consisting of automotive parts, recreational vehicles, bathtubs, shower stalls, counters, appliance housings and liners, building materials, doors, windows, siding, decking, railings and shutters, lawn and garden parts, storage containers, deck board, hand rail siding, and window profiles.

10. The multilayer structure of claim 1, wherein said at least one biopolymer layer b), is in a cellular or foamed form.

11. The multilayer structure of claim 1, wherein the multilayer structure comprises a substrate selected from the group consisting of polystyrene, polystyrene derivatives polystyrene, high impact polystyrene (HIPS), acrylonitrile/butadiene/styrene (ABS), styrene/butadiene or styrene/isoprene (SBS/SIS), hydrogenated SBS/SIS, polyolefin derivatives, polypropylene, polyethylene, thermoplastic polyolefin copolymers, polyvinyl chloride (PVC), and polyvinylidene fluoride (PVDF), and wherein said multilayer structure is formed by an extrusion molding process.

* * * * *